United States Patent
Ali Khan et al.

(10) Patent No.: US 12,378,924 B1
(45) Date of Patent: Aug. 5, 2025

(54) SYSTEMS AND METHODS FOR MIGITATING COLD START EMISSIONS VIA ROTATION OF TURBOCHARGER TURBINE

(71) Applicant: GM GLOBAL TECHNOLOGY OPERATIONS LLC, Detroit, MI (US)

(72) Inventors: Maqsood Rizwan Ali Khan, Troy, MI (US); Mark Claywell, Birmingham, MI (US); Azeem Sarwar, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/904,950

(22) Filed: Oct. 2, 2024

(51) Int. Cl.
*F02D 41/00* (2006.01)
*F02D 41/02* (2006.01)
*F02D 41/06* (2006.01)

(52) U.S. Cl.
CPC ..... *F02D 41/0007* (2013.01); *F02D 41/0255* (2013.01); *F02D 41/064* (2013.01); *F02D 2250/34* (2013.01)

(58) Field of Classification Search
CPC ............. F02D 41/0007; F02D 41/0077; F02D 41/0255; F02D 41/064; F02D 41/0065; F02D 17/105; F02D 2250/35; F02B 37/18; F02M 26/05; F02M 26/06; F02M 26/07; F02M 26/02; F02M 26/16; F02M 35/10222; F01N 5/02; F01N 3/035; F01N 9/00; F01N 2900/1404; F01N 2900/1602; Y02A 50/20; Y02T 10/12; Y02T 10/40; F01D 17/105
See application file for complete search history.

(56) References Cited

U.S. PATENT DOCUMENTS

| | | | |
|---|---|---|---|
| 12,188,404 B1* | 1/2025 | Hardman | F02D 23/00 |
| 2014/0060006 A1* | 3/2014 | Ruona | F01N 3/2006 60/273 |
| 2014/0190161 A1* | 7/2014 | Hayashi | F02B 37/18 60/602 |
| 2015/0113980 A1* | 4/2015 | Ruona | F01N 3/2006 903/905 |

FOREIGN PATENT DOCUMENTS

DE    102018129955 A1    5/2020

* cited by examiner

*Primary Examiner* — Dapinder Singh
(74) *Attorney, Agent, or Firm* — Lorenz & Kopf LLP (57) ABSTRACT

A trigger signal is received from a trigger signal source. A first control signal is issued to a wastegate actuator to open a wastegate in response to the trigger signal. A second control signal is issued to a turbo shaft actuator to rotate a turbine of a turbocharger. The rotation of the turbine causes recirculated air to flow in a recirculation flow path including an exhaust manifold, the turbine, an exhaust wall system, and the wastegate. The exhaust wall system includes a turbine housing of the turbine, exhaust walls disposed between the turbine and the wastegate, and exhaust walls disposed between the turbine and a catalyst brick. At least a portion of the recirculation flow path is adjacent to a side of the catalyst brick. Heat transfer occurs from the recirculated air to the exhaust wall system and to the catalyst brick via the side of the catalyst.

20 Claims, 5 Drawing Sheets

SYSTEMS AND METHODS FOR MIGITATING COLD START EMISSIONS VIA ROTATION OF TURBOCHARGER TURBINE

INTRODUCTION

The technical field generally relates to vehicles, and more particularly relates to systems and methods for mitigating cold start emissions via rotation of turbocharger turbine.

Vehicles that include internal combustion engines generate exhaust gases as a by-product of a combustion process. Such vehicles often rely on a catalyst brick in a catalytic converter to process the exhaust gases prior to release of the processed exhaust gases as emissions from the vehicle. Catalyst bricks typically need to reach an operating temperature to effectively process exhaust gases. The operating temperature is referred to as a catalyst light-off temperature. The catalyst light-off temperature is generally about midway to maximum conversion efficiency temperatures, such as for example 300° C. The maximum conversion efficiency temperature may, for example, be 500° C. A cold-start of an engine occurs when a vehicle is started after the engine has been turned off for several hours. At cold start-up, the vehicle may emit excessive emissions until the catalyst brick reaches the catalyst light-off temperature.

Accordingly, it is desirable to provide systems and methods for mitigating cold start emissions by generating heat via rotation of turbocharger turbine. Other desirable features and characteristics will become apparent from the subsequent detailed description and the appended claims, taken in conjunction with the accompanying drawings and the foregoing technical field and background.

SUMMARY

A method of mitigating cold start emissions generated by a vehicle via rotation of turbocharger turbine includes: receiving at the controller, a trigger signal from a trigger signal source; issuing by the controller, a first control signal to a wastegate actuator to open a wastegate responsive to the trigger signal; and issuing by the controller, a second control signal to a turbo shaft actuator to rotate a turbine of a turbocharger, wherein the rotation of the turbine causes recirculated air to flow in a recirculation flow path including an exhaust manifold, the turbine, an exhaust wall system, and the wastegate, wherein: the exhaust wall system includes a turbine housing of the turbine, exhaust walls disposed between the turbine and the wastegate, and exhaust walls disposed between the turbine and a catalyst brick; at least a portion of the recirculation flow path is adjacent a side of the catalyst brick; and heat transfer occurs from the recirculated air to the exhaust wall system and to the catalyst brick via the side of the catalyst brick.

In at least one embodiment, issuing by the controller, the second control signal to the turbo shaft actuator to rotate the turbine includes issuing by the controller, the second control signal to the turbo shaft actuator to rotate the turbine in a reverse rotation, the reverse rotation of the turbine causing the recirculation flow path to be a reverse recirculation flow path.

In at least one embodiment, the recirculated air enters an outlet of the turbine, the recirculated air entering the turbine having a first temperature; the reverse rotation of the turbine compresses the recirculated air; and the compressed recirculated air having a second temperature exits an inlet of the turbine, the second temperature being greater than the first temperature.

In at least one embodiment, receiving at the controller, the trigger signal, includes receiving a vehicle turn on signal; and issuing by the controller, the first control signal to the wastegate actuator to open the wastegate includes issuing by the controller, the first control signal to the wastegate actuator to partially open the wastegate.

In at least one embodiment, receiving at the controller, the trigger signal includes receiving an engine turn on signal; and issuing by the controller, the first control signal to the wastegate actuator to open the wastegate includes issuing by the controller, the first control signal to the wastegate actuator to fully open the wastegate.

In at least one embodiment, the method further includes: generating by the controller, a turbine rotation speed based on exhaust gas mass flow and exhaust gas temperature; and issuing by the controller, the second control signal to the turbo shaft actuator to rotate the turbine in the reverse rotation at the turbine rotation speed.

In at least one embodiment, receiving at the controller, the trigger signal, includes receiving a vehicle turn on signal; issuing by the controller, the second control signal to the turbo shaft actuator to rotate the turbine includes issuing by the controller, the second control signal to the turbo shaft actuator to rotate the turbine in a forward rotation, the forward rotation of the turbine causing the recirculation flow path to be a forward recirculation flow path; and issuing by the controller, the first control signal to the wastegate actuator to open the wastegate include issuing by the controller, the first control signal to the wastegate actuator to partially open the wastegate.

In at least one embodiment, the method further includes issuing, by the controller, a third control signal to a compressor bypass valve actuator to open a compressor bypass valve responsive to the trigger signal.

In at least one embodiment, a portion of the recirculated air passes through the catalyst brick.

In at least one embodiment, the turbo shaft actuator is a motor generator unit (MGU).

A system for mitigating cold start emissions generated by a vehicle via rotation of turbocharger turbine includes at least one processor and at least one memory communicatively coupled to the at least one processor. The at least one memory includes instructions that upon execution by the at least one processor, causes the at least one processor to: receive a trigger signal from a trigger signal source; issue a first control signal to a wastegate actuator to open a wastegate responsive to the trigger signal; and issue a second control signal to a turbo shaft actuator to rotate a turbine of a turbocharger, wherein the rotation of the turbine causes recirculated air to flow in a recirculation flow path including an exhaust manifold, the turbine, an exhaust wall system, and the wastegate, wherein: the exhaust wall system includes a turbine housing of the turbine, exhaust walls disposed between the turbine and the wastegate, and exhaust walls disposed between the turbine and a catalyst brick; at least a portion of the recirculation flow path is adjacent a side of the catalyst brick; and heat transfer occurs from the recirculated air to the exhaust wall system and to the catalyst brick via the side of the catalyst brick.

In at least one embodiment, the at least one memory further includes instructions that upon execution by the at least one processor, causes the at least one processor to issue the second control signal to the turbo shaft actuator to rotate the turbine in a reverse rotation, the reverse rotation of the turbine causing the recirculation flow path to be a reverse recirculation flow path.

In at least one embodiment, the recirculated air enters an outlet of the turbine, the recirculated air entering the turbine having a first temperature; the reverse rotation of the turbine compresses the recirculated air; and the compressed recirculated air having a second temperature exits an inlet of the turbine, the second temperature being greater than the first temperature.

In at least one embodiment, the at least one memory further includes instructions that upon execution by the at least one processor, causes the at least one processor to: receive the trigger signal, the trigger signal including a vehicle turn on signal; and issue the first control signal to the wastegate actuator to partially open the wastegate.

In at least one embodiment, the at least one memory further includes instructions that upon execution by the at least one processor, causes the at least one processor to: receive the trigger signal, the trigger signal including an engine turn on signal; and issue the first control signal to the wastegate actuator to fully open the wastegate.

In at least one embodiment, the at least one memory further includes instructions that upon execution by the at least one processor, causes the at least one processor to: generate a turbine rotation speed based on exhaust gas mass flow and exhaust gas temperature; and issue the second control signal to the turbo shaft actuator to rotate the turbine in the reverse rotation at the turbine rotation speed.

In at least one embodiment, the at least one memory further includes instructions that upon execution by the at least one processor, causes the at least one processor to: receive the trigger signal, the trigger signal including a vehicle turn on signal; issue the second control signal to the turbo shaft actuator to rotate the turbine in a forward rotation, the forward rotation of the turbine causing the recirculation flow path to be a forward recirculation flow path; and issue the first control signal to the wastegate actuator to partially open the wastegate.

In at least one embodiment, the at least one memory further includes instructions that upon execution by the at least one processor, causes the at least one processor to issue a third control signal to a compressor bypass valve actuator to open a compressor bypass valve responsive to the trigger signal.

In at least one embodiment, a portion of the recirculated air passes through the catalyst brick.

A vehicle including a system for mitigating cold start emissions generated by the vehicle via rotation of turbocharger turbine includes: at least one processor; and at least one memory communicatively coupled to the at least one processor. The at least one memory includes instructions that upon execution by the at least one processor, causes the at least one processor to: receive a trigger signal from a trigger signal source; issue a first control signal to a wastegate actuator to open a wastegate responsive to the trigger signal; and issue a second control signal to a turbo shaft actuator to rotate a turbine of a turbocharger, wherein the rotation of the turbine causes recirculated air to flow in a recirculation flow path including an exhaust manifold, the turbine, an exhaust wall system, and the wastegate, wherein: the exhaust wall system includes a turbine housing of the turbine, exhaust walls disposed between the turbine and the wastegate, and exhaust walls disposed between the turbine and a catalyst brick; at least a portion of the recirculation flow path is adjacent a side of the catalyst brick; and heat transfer occurs from the recirculated air to the exhaust wall system and to the catalyst brick via the side of the catalyst brick.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
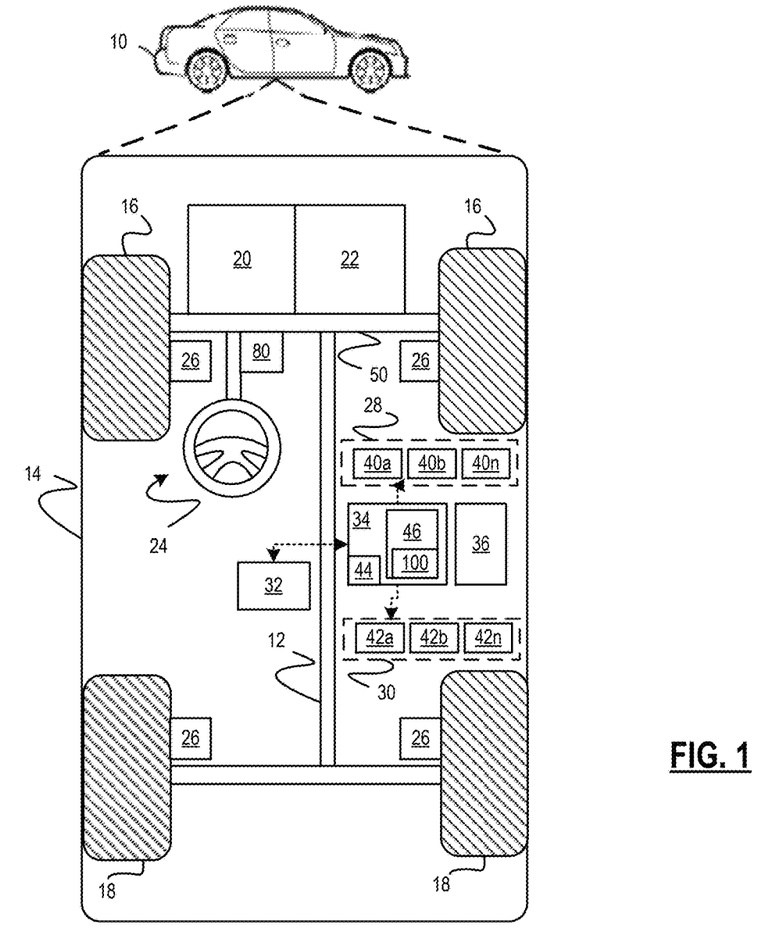
FIG. 1 is a functional block diagram of a vehicle including a cold start emission mitigation system in accordance with at least one embodiment.

Referring to FIG. 1, a functional block diagram of a vehicle including a cold start emission mitigation system 100 in accordance with at least one embodiment is shown. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs).

In various embodiments, the body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 includes an internal combustion engine (ICE). The propulsion system 20 may, in various embodiments, also include an electric machine such as a traction motor, a fuel cell propulsion system, and/or any other type of propulsion configuration. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16, 18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, a steering wheel sensor, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16, 18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate. In at least one embodiment, the vehicle dynamic sensors provide vehicle movement data.

The actuator system 30 includes one or more actuator devices 42a-42n that control one or more vehicle features such as, but not limited to, one or more vehicle wheels 16, 18 the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. In at least one embodiment, the computer-readable storage device 46 is at least one memory configured to store the cold start emission mitigation system 100.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
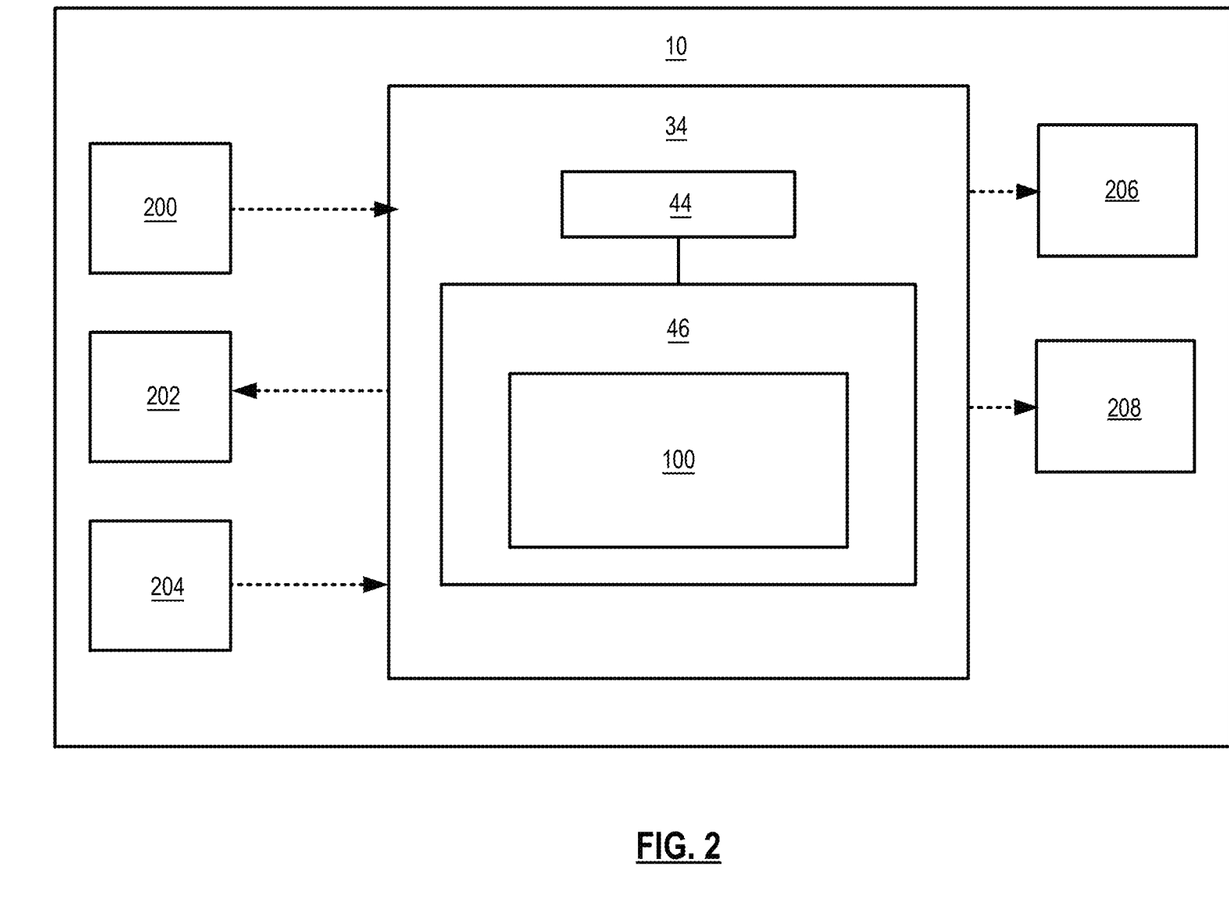
FIG. 2 is a functional block diagram of a controller including a cold start emission mitigation system in accordance with at least one embodiment.

Referring to FIG. 2, a functional block diagram of a controller 34 including a cold start emission mitigation system 100 in accordance with at least one embodiment is shown. The controller 34 includes at least one processor 44 and at least one memory 46. The at least one processor 44 is a programmable device that includes one or more instructions stored in or associated with the at least one memory 46. The at least one memory 46 includes instructions that the at least one processor 44 is configured to execute. The at least one memory 46 includes an embodiment of the cold start emission mitigation system 100 that is configured to mitigate cold start emissions by managing turbocharger turbine rotation. In at least one embodiment, the cold start emission mitigation system 100 that is configured to mitigate cold start emissions by managing turbocharger turbine rotation before fuel injection or combustion events are to occur. In one instance, the turbocharger rotation is to occur before the engine actually has any cylinder filing events. The controller 34 is configured to be communicatively coupled to a trigger signal source 200, a turbo shaft actuator 202, one or more oxygen sensor(s) 204, a wastegate actuator 206, and a compressor bypass valve actuator 208. In at least one embodiment, the trigger signal source 200 is configured to generate a vehicle turn on signal when a vehicle 10 is turned on. In at least one embodiment, the trigger signal source 200 is configured to generate an engine turn on signal when the engine turns on. The controller 34 may include additional components that facilitate operation of the cold start emission mitigation system 100.

Figure 3:
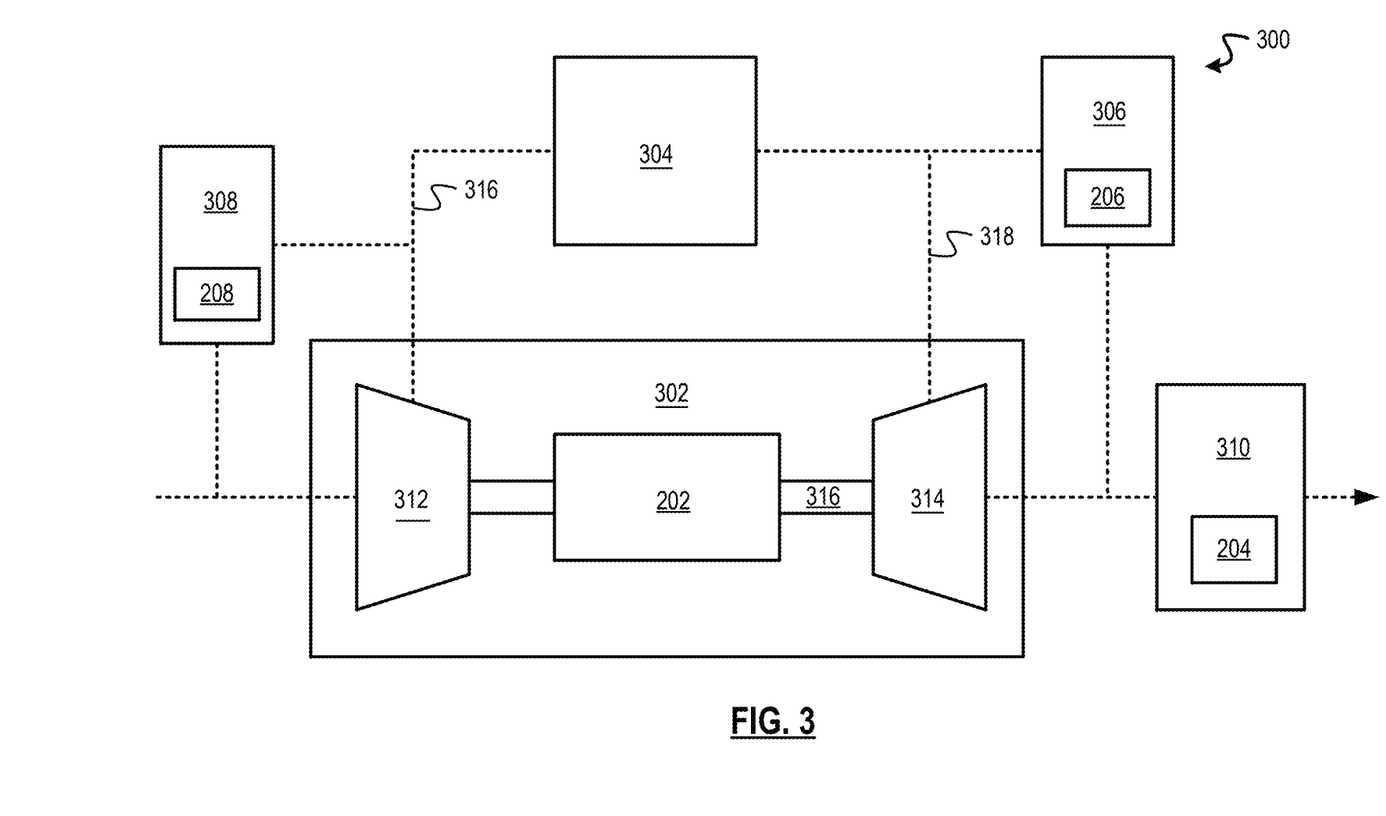
FIG. 3 is a functional block diagram of an internal combustion engine system in accordance with at least one embodiment.

Referring to FIG. 3, a functional block diagram of an internal combustion engine system 300 in accordance with at least one embodiment is shown. The internal combustion engine system 300 includes a turbocharger 302, an engine 304, a wastegate 306, a compressor bypass valve 308, and a catalyst brick 310. The turbocharger 302 includes a compressor 312, a turbine 314, a turbine shaft 316, and a turbine shaft actuator 202. The wastegate 306 includes a wastegate actuator 206. The compressor bypass valve 308 includes a compressor bypass valve actuator 208. The catalyst brick 310 is associated with the oxygen sensor(s) 204. The catalyst light off temperature is determined based on oxygen sensor data received from the oxygen sensor(s) 204. The conversion of the exhaust gas hydrocarbon and nitrous oxides is determined via the oxygen content. In at least one embodiment, the turbo shaft actuator 202 is a motor generation unit (MGU).

The internal combustion engine system 300 includes an intake manifold 316 and an exhaust manifold 318. The intake manifold 316 fluidly couples an outlet of the compressor 312 to intake valves of the cylinders of the engine 304. The exhaust manifold 318 fluidly couples exhaust valves of the cylinders of the engine 304 to an inlet of the turbine 314. The internal combustion engine system 300 may include additional components that facilitate operation of the internal combustion engine system 300.

During normal engine operation, the compressor 312 draws in ambient air and generates compressed air. The engine 304 receives the compressed air from the compressor 312 via the intake manifold 316. Fuel is injected into the engine 304. The compressed air and the fuel combine to form an air-fuel mixture used in a combustion process by the engine 304. Exhaust gas is generated by the engine 304 as a by-product of the combustion process. The exhaust gas generated by the engine 304 during the combustion process flows to an inlet of the turbine 314 via the exhaust manifold 318. The exhaust gas causes the turbine 314 to rotates as the exhaust passes through the turbine 314. The exhaust gas flows through the turbine 314 and exits via an outlet of the turbine 314 and passes through the catalyst brick 310 prior to being released as emissions from the vehicle 10.

The vehicle 10 relies on the catalyst brick 310 to process the exhaust gas generated by the combustion process prior to the release of the exhaust gas as emissions from the vehicle 10. Catalyst bricks 310 typically need to reach an operating temperature to effectively process exhaust gases. The operating temperature is referred to as a catalyst light-off temperature. The catalyst light-off temperature is generally about midway to maximum conversion efficiency temperatures, such as for example 300° C. The maximum conversion efficiency temperature may, for example, be 500° C. A cold-start of an internal combustion engine system 300 occurs when a vehicle 10 is started after the engine 304 has been turned off for several hours. At cold start-up, the vehicle 10 may emit excessive emissions until the catalyst brick 310 reaches the catalyst light-off temperature. The cold start emission mitigation system 100 is configured to manage rotation of the turbine 314 via the turbo shaft actuator 202 to accelerate the process of the catalyst brick 310 reaching the catalyst light-off temperature to mitigate cold start emissions. The cold start emission mitigation system 100 manages the rotation of the turbine 314 to cause recirculated air to flow in a recirculation flow path. The recirculation flow path includes the exhaust manifold 318, the turbine 314, the exhaust wall system, and the wastegate 306. The exhaust wall system includes a turbine housing of the turbine, exhaust walls disposed between the turbine and the wastegate, and exhaust walls disposed between the turbine and a catalyst brick. Heat transfer occurs from the recirculated air to the exhaust wall system and to the catalyst brick 310 via a side of the catalyst brick 310 facing the recirculation flow path. Warm up of the exhaust wall system will benefit the catalyst light-off. Operation of embodiments of the cold start emission mitigation system 100 will be described in greater detail below.

Figure 4:
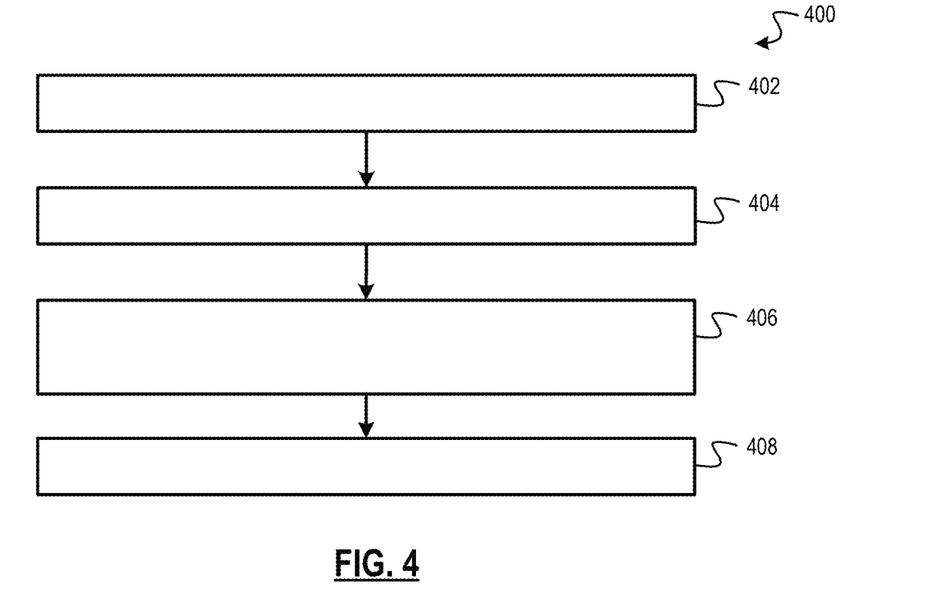
FIG. 4 is a flowchart representation of an exemplary method for mitigating cold start emissions via reverse rotation of a turbine following vehicle turn on and prior to engine turn on in accordance with at least one embodiment.

Referring to FIG. 4, a flowchart representation of an exemplary method 400 for mitigating cold start emissions reverse rotation of a turbine 314 following vehicle turn on and prior to engine turn on in accordance with at least one embodiment is shown. The method 400 will be described with reference to an exemplary implementation of an embodiment of a cold start emission mitigation system 100. As can be appreciated in light of the disclosure, the order of operation within the method 400 is not limited to the sequential execution as illustrated in FIG. 4 but may be performed in one or more varying orders as applicable and in accordance with the present disclosure.

At 402, the cold start emission mitigation system 100 receives a trigger signal from a trigger signal source 200 of the vehicle 10. The trigger signal is a vehicle turn on signal. In at least one embodiment, the trigger signal source 200 is a vehicle turn on button. The vehicle turn on button turns on the vehicle 10 but does not start the engine 304 of the vehicle 10. At 404, the cold start emission mitigation system 100 issues a command to the wastegate actuator 206 to partially open the wastegate 306. In reverse rotation, the turbine 314 may go into turbine side surge. The wastegate opening is controlled against turbine side surge. To limit turbine side surge, the wastegate 306 is not closed too far.

At 406, the cold start emission mitigation system 100 issues a command to the turbo shaft actuator 202 to rotate the turbine 314 in a reverse rotation. In at least embodiment, the turbo shaft actuator 202 is a motor generator unit (MGU). The MGU implements the reverse rotation of the turbine 314 in response to the command from the cold start emission mitigation system 100.

The reverse rotation of the turbine 314 causes recirculated air to flow in a reverse recirculation flow path. The reverse recirculation flow path includes the exhaust manifold 318, the wastegate 306, the exhaust wall system, and the turbine 314. When the turbine 314 is rotated in the reverse rotation, the turbine 314 operates as a compressor. The reverse rotation of the turbine 314 causes the recirculated air to flow from the exhaust manifold 318 through the wastegate 306 through the exhaust wall system to an outlet of the turbine 314 and out through an inlet of the turbine 314. The recirculated air that flows from the exhaust manifold 318 into the outlet of the turbine 314 is the air that remained in the exhaust manifold 318 after the engine 304 was previously turned off. In at least one embodiment, additional air may flow from the intake manifold 316 through the engine 304 to the outlet of the turbine 314 via the exhaust manifold 318 due to an overlap in at least partial openings of some of the intake valves with respect to the associated exhaust valves of some of the cylinders of the engine 304 when the engine was previously turned off. The additional air becomes part of the recirculated air.

The reverse rotation of the turbine 314 causes the recirculated air to enter the outlet of the turbine 314 and exit the turbine 314 via the inlet of the turbine 314. Since the reverse rotation of the turbine 314 causes the turbine 314 to operate as a compressor, the recirculated air that flows into the outlet of the turbine 314 is compressed as the recirculated air flows out through the inlet of the turbine 314. The recirculated air that enters the outlet of the turbine 314 has a first temperature. The compressed recirculated air that exits the inlet of the turbine 314 has a second temperature. The second temperature is greater than the first temperature. The compressed recirculated air that exits the turbine 314 is heated recirculated air that is hotter than the recirculated air that entered the turbine 314.

The heated recirculated air exits the inlet of the turbine 314 and flows to the exhaust wall system via the exhaust manifold 318 and the wastegate 306. Heat transfer occurs from the heated recirculated air to the exhaust wall system thereby heating the exhaust wall system. A side of the catalyst brick 310 faces the reverse recirculation flow path of the recirculated air. The heated recirculated air contacts that side of the catalyst brick 310 and heat is transferred from the heated recirculated air to the catalyst brick 310. The heated recirculated air expands as it flows and a portion of the heated recirculated air flows from the exhaust wall system through the catalyst brick 310. Heat from the heated recirculated air is transferred to the catalyst brick 310 as the heated recirculated air flows through the catalyst brick 310. The recirculated air is being warmed up by successive passes through the turbine 314 that is doing compression work on the recirculated air.

Since the exhaust wall system and the catalyst brick 310 are heated by the heated recirculated air prior to turning on the engine 304, it will take less time for the catalyst brick 310 to reach the catalyst light-off temperature once the engine 304 is turned on and normal engine operation is initiated. The emissions generated following use of the emission mitigation system 100 to heat the exhaust wall system and the catalyst brick 310 prior to engine cold-start are lower than emissions generated at engine cold start without the use of the emission mitigation system 100. The reverse rotation of the turbine 314 generates heat within the exhaust system due to local air movement and also compression within the exhaust recirculation flow path. The reverse rotation of the turbine 314 allows the compressor 312 to act as a turbine. When the compressor 312 is acting like a turbine, the condition of surge is much less likely. The turbine 314 will act like a compressor, thus is liable to a surge condition, but the turbine 314 and the exhaust system is much more robust to a surge condition than the compressor 312.

In at least one embodiment, when the cold start emission mitigation system 100 issues the command to the wastegate actuator 206 to partially open the wastegate 306 at 404, the amount of the partial opening of the wastegate 306 is sufficient to further compress the recirculated air flowing in the reverse recirculation flow path while ensuring that the pressure applied to the turbine 314 by the recirculated air does not damage the turbine 314. The additional compression of the recirculated air operates to further heat the recirculated air.

At 408, the cold start emission mitigation system 100 issues a command to the compressor bypass valve actuator 208 to open the compressor bypass valve 308. The implementation of the reverse rotation of the turbine 314 by the turbo shaft actuator 202 causes a reverse rotation of the compressor 312. The reverse rotation of the compressor 312 causes the compressor 312 to operate as a turbine. The reverse rotation of the compressor 312 causes air from the intake manifold 316 to flow to an outlet of the compressor 312, exit via an inlet of the compressor 312, flow through the compressor bypass valve 308, and back to the outlet of the compressor 312 via the intake manifold 316. The air that flows from the intake manifold 316 to the outlet of the compressor 312 is the air that remained in the intake manifold 316 after the engine 304 was previously turned off. The compressor bypass valve 308 is opened to reduce the pressure caused by the flow of air through the compressor 312 and prevent damage to the compressor 312.

Figure 5:
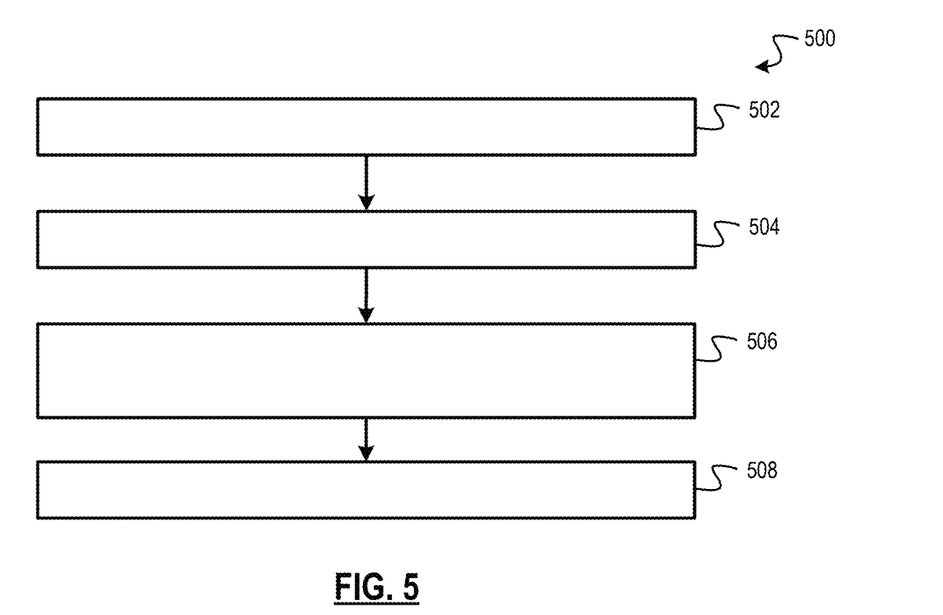
FIG. 5 is a flowchart representation of an exemplary method for mitigating cold start emissions via forward rotation of a turbine following vehicle turn on and prior to engine turn on in accordance with at least one embodiment.

Referring to FIG. 5, a flowchart representation of an exemplary method 500 for mitigating cold start emissions via forward rotation of a turbine following vehicle turn on and prior to engine turn on in accordance with at least one embodiment is shown. The method 500 will be described with reference to an exemplary implementation of an embodiment of a cold start emission mitigation system 100. As can be appreciated in light of the disclosure, the order of operation within the method 500 is not limited to the sequential execution as illustrated in FIG. 5 but may be performed in one or more varying orders as applicable and in accordance with the present disclosure.

At 502, the cold start emission mitigation system 100 receives a trigger signal from a trigger signal source 200 of the vehicle 10. The trigger signal is a vehicle turn on signal. In at least one embodiment, the trigger signal source 200 is a vehicle turn on button. The vehicle turn on button turns on the vehicle 10 but does not start the engine 304 of the vehicle 10. At 504, the cold start emission mitigation system 100 issues a command to the wastegate actuator 206 to partially open the wastegate 306.

At 506, the cold start emission mitigation system 100 issues a command to the turbo shaft actuator 202 to rotate the turbine 314 in a forward rotation. In at least embodiment, the turbo shaft actuator 202 is a motor generator unit (MGU). The MGU implements the forward rotation of the turbine 314 in response to the command from the cold start emission mitigation system 100.

The forward rotation of the turbine 314 causes recirculated air to flow in a forward recirculation flow path. The forward recirculation flow path includes the exhaust manifold 318, the turbine 314, the exhaust wall system, and the wastegate 306. When the turbine 314 is rotated in the forward rotation, the turbine 314 operates as a turbine. The forward rotation of the turbine 314 causes the recirculated air to flow from the exhaust manifold 318 to the inlet of the turbine 314, exit through the outlet of the turbine 314, through the wastegate 306 and back to the inlet of the turbine 314 via the exhaust manifold 318. The recirculated air that flows from the exhaust manifold 318 into the intel of the turbine 314 is the air that remained in the exhaust manifold 318 after the engine 304 was previously turned off. In at least one embodiment, additional air may flow from the intake manifold 316 through the engine 304 to the inlet of the turbine 314 via the exhaust manifold 318 due to an overlap in at least partial openings of some of the intake valves with respect to the associated exhaust valves of some of the cylinders of the engine 304 when the engine was previously turned off. The additional air becomes part of the recirculated air.

The forward rotation of the turbine 314 causes the recirculated air to enter the inlet of the turbine 314 and exit the turbine 314 via the outlet of the turbine 314. The recirculated air that enters the inlet of the turbine 314 has a first temperature. The recirculated air that exits the outlet of the turbine 314 has a second temperature. The second temperature is greater than the first temperature. The recirculated air that exits the turbine 314 is heated recirculated air that is hotter than the recirculated air that entered the turbine 314.

The recirculated air exits the outlet of the turbine 314 and flows through the exhaust wall system. Heat transfer occurs from the heated recirculated air to the exhaust wall system thereby heating the exhaust wall system. A side of the catalyst brick 310 faces the forward recirculation flow path of the recirculated air. The heated recirculated air contacts that side of the catalyst brick 310 and heat is transferred from the heated recirculated air to the catalyst brick 310. The heated recirculated air expands as it flows and a portion of the heated recirculated air flows from the exhaust wall system through the catalyst brick 310. Heat from the heated recirculated air is transferred to the catalyst brick 310 as the heated recirculated air flows through the catalyst brick 310.

Since the exhaust wall system and the catalyst brick 310 are heated by the heated recirculated air prior to turning on the engine 304, it will take less time for the catalyst brick 310 to reach the catalyst light-off temperature once the engine 304 is turned on and normal engine operation is initiated. Normal engine operation indicates the occurrence of cylinder firing events. The emissions generated following use of the emission mitigation system 100 to heat the exhaust wall system and the catalyst brick 310 prior to engine cold-start are lower than emissions generated at engine cold start without the use of the emission mitigation system 100.

In at least one embodiment, when the cold start emission mitigation system 100 issues the command to the wastegate actuator 206 to partially open the wastegate 306 at 504, the amount of the partial opening of the wastegate 306 is sufficient to compress the recirculated air flowing in the forward recirculation flow path while ensuring that the pressure applied to the turbine 314 by the recirculated air does not damage the turbine 314. The compression of the recirculated air operates to further heat the recirculated air.

At 508, the cold start emission mitigation system 100 issues a command to the compressor bypass valve actuator 208 to open the compressor bypass valve 308. The implementation of the forward rotation of the turbine 314 by the turbo shaft actuator 202 causes a forward rotation of the compressor 312.

The forward rotation of the compressor 312 causes air from the intake manifold 316 to flow through the compressor bypass valve 308 to the inlet of the compressor 312 and exit via the outlet of the compressor 312. The air that flows from the intake manifold 316 to the inlet of the compressor 312 via the compressor bypass valve 308 is the air that remained in the intake manifold 316 after the engine 304 was previously turned off. The compressor bypass valve 308 is opened to reduce the pressure caused by the flow of air through the compressor 312 and prevent damage to the compressor 312. The recirculation of the air flow through the intake manifold 316, the compressor bypass valve 306 and compressor 312 heats up the components on the intake side of the internal combustion engine system 300 prior to engine turn on.

Figure 6:
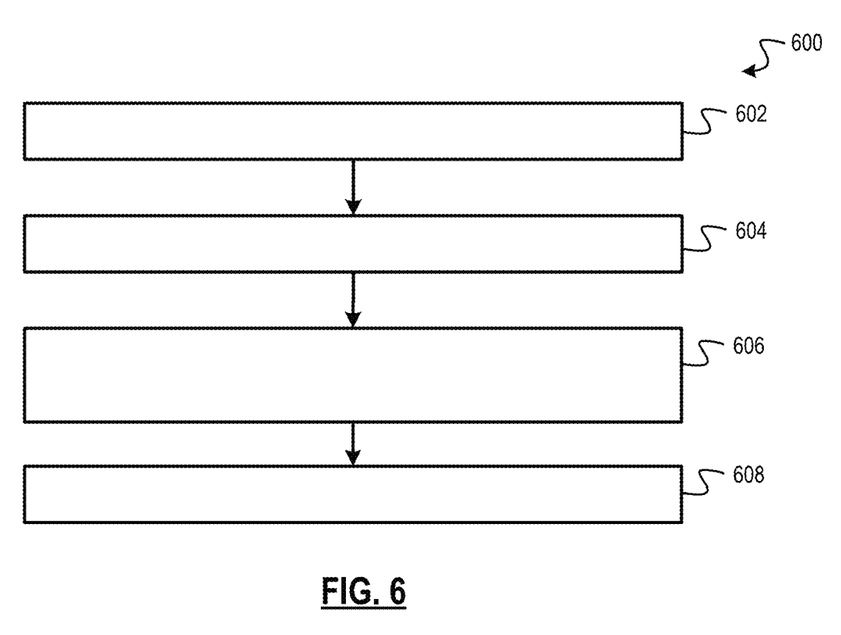
FIG. 6 is a flowchart representation of an exemplary method for mitigating cold start emissions via reverse rotation of a turbine following engine turn on in accordance with at least one embodiment.

Referring to FIG. 6, a flowchart representation of an exemplary method 600 for mitigating cold start emissions via reverse rotation of a turbine 314 following engine turn on in accordance with at least one embodiment is shown. The method 600 will be described with reference to an exemplary implementation of an embodiment of a cold start emission mitigation system 100. As can be appreciated in light of the disclosure, the order of operation within the method 600 is not limited to the sequential execution as illustrated in FIG. 6 but may be performed in one or more varying orders as applicable and in accordance with the present disclosure.

At 602, the cold start emission mitigation system 100 receives a trigger signal from a trigger signal source 200 of the vehicle 10. The trigger signal is an engine turn on signal. An engine turn signal indicates that there are cylinder firing events. In at least one embodiment, the trigger signal source 200 is an ignition switch. The ignition switch turns on the engine 304 of the vehicle 10. At 604, the cold start emission mitigation system 100 issues a command to the wastegate actuator 206 to fully open the wastegate 306.

At 606, the cold start emission mitigation system 100 issues a command to the turbo shaft actuator 202 to rotate the turbine 314 in a reverse rotation at a turbine rotation speed. In at least embodiment, the turbo shaft actuator 202 is a motor generator unit (MGU). The MGU implements the reverse rotation of the turbine 314 in response to the command from the cold start emission mitigation system 100. The cold start emission mitigation system 100 generates the turbine rotation speed based on exhaust gas mass flow and exhaust gas temperature.

The reverse rotation of the turbine 314 causes recirculated air to flow in a reverse recirculation flow path. The reverse recirculation flow path includes the exhaust manifold 318, the wastegate 306, the exhaust wall system, and the turbine 314. When the turbine 314 is rotated in the reverse rotation, the turbine 314 operates as a compressor. The reverse rotation of the turbine 314 causes the recirculated air to flow from the exhaust manifold 318 through the wastegate 306 through the exhaust wall system to an outlet of the turbine 314 and out through an inlet of the turbine 314.

The reverse rotation of the turbine 314 causes the recirculated air to enter the outlet of the turbine 314 and exit the turbine 314 via the inlet of the turbine 314. Since the reverse rotation of the turbine 314 causes the turbine 314 to operate as a compressor, the recirculated air that flows into the outlet of the turbine 314 is compressed as the recirculated air flows out through the inlet of the turbine 314. The recirculated air that enters the outlet of the turbine 314 has a first temperature. The compressed recirculated air that exits the inlet of the turbine 314 has a second temperature. The second temperature is greater than the first temperature. The compressed recirculated air that exits the turbine 314 is heated recirculated air that is hotter than the recirculated air that entered the turbine 314.

The heated recirculated air exits the inlet of the turbine 314 and flows to the exhaust wall system via the exhaust manifold 318 and the wastegate 306. Heat transfer occurs from the heated recirculated air to the exhaust wall system thereby heating the exhaust wall system. The exhaust wall system extends from the outlet of the turbine 314 to the catalyst brick 310. A side of the catalyst brick 310 faces the reverse recirculation flow path of the recirculated air. The heated recirculated air contacts that side of the catalyst brick 310 and heat is transferred from the heated recirculated air to the catalyst brick 310. The heated recirculated air expands as it flows and a portion of the heated recirculated air flows from the exhaust wall system through the catalyst brick 310. Heat from the heated recirculated air is transferred to the catalyst brick 310 as the heated recirculated air flows through the catalyst brick 310.

At 608, the cold start emission mitigation system 100 issues a command to the compressor bypass valve actuator 208 to open the compressor bypass valve 308. The implementation of the reverse rotation of the turbine 314 by the turbo shaft actuator 202 causes a reverse rotation of the compressor 312. The reverse rotation of the compressor 312 causes the compressor 312 to operate as a turbine. The reverse rotation of the compressor 312 causes air from the intake manifold 316 to flow to an outlet of the compressor 312, exit via an inlet of the compressor 312, flow through the compressor bypass valve 308, and back to the outlet of the compressor 312 via the intake manifold 316. The compressor bypass valve 308 is opened to reduce the pressure caused by the flow of air through the compressor 312 and prevent damage to the compressor 312. In at least one embodiment, normal operation of the internal combustion engine system 300 is resumed at some point after implementation of the warm-up method.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of mitigating cold start emissions in a vehicle via rotation of a turbine of a turbocharger comprising:
   receiving at a controller, a trigger signal from a trigger signal source, wherein the trigger signal comprises a vehicle turn on signal and the trigger signal source comprises a vehicle turn on button; and
   prior to turning on an engine of the vehicle:
      issuing by the controller, a first control signal to a wastegate actuator to open a wastegate responsive to the trigger signal; and
      issuing by the controller, a second control signal to a turbo shaft actuator to rotate the turbine of the turbocharger in a reverse rotation, wherein the reverse rotation of the turbine causes recirculated air to flow in a reverse recirculation flow path comprising an exhaust manifold, the turbine, an exhaust wall system, and the wastegate, wherein:
         the exhaust wall system comprises a turbine housing of the turbine, exhaust walls disposed between the turbine and the wastegate, and exhaust walls disposed between the turbine and a catalyst brick;
         at least a portion of the reverse recirculation flow path is adjacent a side of the catalyst brick;
         heat transfer occurs from the recirculated air to the exhaust wall system and to the catalyst brick via the side of the catalyst brick; and
         the recirculated air comprises air that remained in the exhaust manifold after the engine was previously turned off and air from an intake manifold through the engine to an outlet of the turbine via the exhaust manifold due to an overlap in a partial opening of an intake valve with respect to an exhaust value of at least one cylinder of the engine when the engine was previously turned off.

2. The method of claim 1, wherein:
   the recirculated air enters the outlet of the turbine, the recirculated air entering the turbine having a first temperature;
   the reverse rotation of the turbine compresses the recirculated air; and the compressed recirculated air having a second temperature exits an inlet of the turbine, the second temperature being greater than the first temperature.

3. The method of claim 1, wherein:
issuing by the controller, the first control signal to the wastegate actuator to open the wastegate comprises issuing by the controller, the first control signal to the wastegate actuator to partially open the wastegate.

4. The method of claim 1, wherein:
issuing by the controller, the first control signal to the wastegate actuator to open the wastegate comprises issuing by the controller, the first control signal to the wastegate actuator to fully open the wastegate.

5. The method of claim 1, wherein a portion of the recirculated air passes through the catalyst brick.

6. The method of claim 1, wherein the turbo shaft actuator is a motor generator unit (MGU).

7. The method of claim 1, wherein the reverse rotation of the turbine causes the recirculated air to flow in the reverse recirculation flow path from the exhaust manifold through the wastegate through the exhaust wall system to the outlet of the turbine, and through an inlet of the turbine.

8. The method of claim 1, further comprising issuing, by the controller, a third control signal to a compressor bypass valve actuator to open a compressor bypass valve responsive to the trigger signal prior to turning on the engine.

9. The method of claim 8, wherein:
the reverse rotation of the turbine causes a reverse rotation of a compressor;
the reverse rotation of the compressor causes air from the intake manifold to flow to an outlet of the compressor via an inlet of the compressor, flow through the compressor bypass valve and back to the outlet of the compressor; and
the air from the intake manifold is the air that remained in the intake manifold after the engine was previously turned off.

10. A system for mitigating cold start emissions generated by a vehicle via rotation of a turbine of a turbocharger, comprising:
at least one processor; and
at least one memory communicatively coupled to the at least one processor, the at least one memory comprising instructions that upon execution by the at least one processor, causes the at least one processor to:
receive a trigger signal from a trigger signal source, wherein the trigger signal comprises a vehicle turn on signal and the trigger signal source comprises a vehicle turn on button; and
prior to turning on an engine of the vehicle:
issue a first control signal to a wastegate actuator to open a wastegate responsive to the trigger signal; and
issue a second control signal to a turbo shaft actuator to rotate the turbine of the turbocharger in a reverse rotation, wherein the reverse rotation of the turbine causes recirculated air to flow in a reverse recirculation flow path comprising an exhaust manifold, the turbine, an exhaust wall system, and the wastegate, wherein:
the exhaust wall system comprises a turbine housing of the turbine, exhaust walls disposed between the turbine and the wastegate, and exhaust walls disposed between the turbine and a catalyst brick;
at least a portion of the recirculation flow path is adjacent a side of the catalyst brick;

heat transfer occurs from the recirculated air to the exhaust wall system and to the catalyst brick via the side of the catalyst brick; and
the recirculated air comprises air that remained in the exhaust manifold after the engine was previously turned off and air from an intake manifold through the engine to an outlet of the turbine via the exhaust manifold due to an overlap in a partial opening of an intake valve with respect to an exhaust value of at least one cylinder of the engine when the engine was previously turned off.

11. The system of claim 10, wherein:
the recirculated air enters the outlet of the turbine, the recirculated air entering the turbine having a first temperature;
the reverse rotation of the turbine compresses the recirculated air; and
the compressed recirculated air having a second temperature exits an inlet of the turbine, the second temperature being greater than the first temperature.

12. The system of claim 10, wherein the at least one memory further comprises instructions that upon execution by the at least one processor, causes the at least one processor to:
issue the first control signal to the wastegate actuator to partially open the wastegate.

13. The system of claim 10, wherein the at least one memory further comprises instructions that upon execution by the at least one processor, causes the at least one processor to:
issue the first control signal to the wastegate actuator to fully open the wastegate.

14. The system of claim 10, wherein a portion of the recirculated air passes through the catalyst brick.

15. The system of claim 10, wherein the reverse rotation of the turbine causes the recirculated air to flow in the reverse recirculation flow path from the exhaust manifold through the wastegate through the exhaust wall system to the outlet of the turbine, and through an inlet of the turbine.

16. The system of claim 10, wherein the at least one memory further comprises instructions that upon execution by the at least one processor, causes the at least one processor to issue a third control signal to a compressor bypass valve actuator to open a compressor bypass valve responsive to the trigger signal prior to turning on the engine.

17. The system of claim 16, wherein:
the reverse rotation of the turbine causes a reverse rotation of a compressor;
the reverse rotation of the compressor causes air from the intake manifold to flow to an outlet of the compressor via an inlet of the compressor, flow through the compressor bypass valve and back to the outlet of the compressor; and
the air from the intake manifold is the air that remained in the intake manifold after the engine was previously turned off.

18. A vehicle including a system for mitigating cold start emissions generated by the vehicle via rotation of a turbine of a turbocharger comprising:
at least one processor; and
at least one memory communicatively coupled to the at least one processor, the at least one memory comprising instructions that upon execution by the at least one processor, causes the at least one processor to:
receive a trigger signal from a trigger signal source, wherein the trigger signal comprises a vehicle turn on signal and the trigger signal source comprises a vehicle turn on button; and;

prior to turning on an engine of the vehicle:

issue a first control signal to a wastegate actuator to open a wastegate responsive to the trigger signal; and issue a second control signal to a turbo shaft actuator to rotate the turbine of the turbocharger in a reverse rotation, wherein the reverse rotation of the turbine causes recirculated air to flow in a reverse recirculation flow path comprising an exhaust manifold, the turbine, an exhaust wall system, and the wastegate, wherein:

the exhaust wall system comprises a turbine housing of the turbine, exhaust walls disposed between the turbine and the wastegate, and exhaust walls disposed between the turbine and a catalyst brick;

at least a portion of the recirculation flow path is adjacent a side of the catalyst brick;

heat transfer occurs from the recirculated air to the exhaust wall system and to the catalyst brick via the side of the catalyst brick; and the recirculated air comprises air that remained in the exhaust manifold after the engine was previously turned off and air from an intake manifold through the engine to an outlet of the turbine via the exhaust manifold due to an overlap in a partial opening of an intake valve with respect to an exhaust value of at least one cylinder of the engine when the engine was previously turned off.

19. The vehicle of claim 18, wherein the reverse rotation of the turbine causes the recirculated air to flow in the reverse recirculation flow path from the exhaust manifold through the wastegate through the exhaust wall system to the outlet of the turbine, and through an inlet of the turbine.

20. The vehicle of claim 18, wherein:

the at least one memory comprising instructions that upon execution by the at least one processor, causes the at least one processor to issue a third control signal to a compressor bypass valve actuator to open a compressor bypass valve responsive to the trigger signal prior to turning on the engine;

the reverse rotation of the turbine causes a reverse rotation of a compressor;

the reverse rotation of the compressor causes air from the intake manifold to flow to an outlet of the compressor via an inlet of the compressor, flow through the compressor bypass valve and back to the outlet of the compressor; and the air from the intake manifold is the air that remained in the intake manifold after the engine was previously turned off.

* * * * *